(12) United States Patent
Ito et al.

(10) Patent No.: US 6,980,506 B2
(45) Date of Patent: Dec. 27, 2005

(54) PICKUP APPARATUS FOR DISK PLAYER HAVING A FRAME FOR SUPPORTING A HALF-MIRROR

(75) Inventors: Tatsuya Ito, Osaka (JP); Hideki Kume, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 542 days.

(21) Appl. No.: 09/964,170

(22) Filed: Sep. 26, 2001

(65) Prior Publication Data

US 2002/0036975 A1 Mar. 28, 2002

(30) Foreign Application Priority Data

Sep. 26, 2000 (JP) .................................... P2000-292809

(51) Int. Cl.⁷ ................................................. G11B 7/00
(52) U.S. Cl. ................................................. 369/112.29
(58) Field of Search ........................ 369/112.29, 112.17

(56) References Cited

U.S. PATENT DOCUMENTS

| | | | | |
|---|---|---|---|---|
| 4,767,921 A | * | 8/1988 | Kawasaki et al. | 250/201.5 |
| 5,592,459 A | * | 1/1997 | Kasahara | 369/44.21 |
| 6,116,774 A | * | 9/2000 | Sasaki et al. | 368/280 |
| 6,351,031 B1 | * | 2/2002 | Iijima et al. | 257/698 |
| 6,584,061 B2 | * | 6/2003 | Yanagisawa et al. | 369/112.17 |

FOREIGN PATENT DOCUMENTS

| | | | | |
|---|---|---|---|---|
| JP | 2-183418 | * | 7/1990 | G11B/7/085 |
| JP | 9-320086 | * | 12/1997 | G11B/7/12 |
| JP | 10-302295 | * | 11/1998 | G11B/7/135 |
| JP | 2001-222839 | * | 8/2001 | G11B/7/135 |

OTHER PUBLICATIONS

MAT (Machine assited english translation of JP 9–320086.*

* cited by examiner

Primary Examiner—Aristotelis M Psitos
(74) Attorney, Agent, or Firm—Osha & May L.L.P.

(57) ABSTRACT

A pickup apparatus 1 is directed to an apparatus for optically reading-out information on a disk 3 arranged in a disk player, and comprises a pickup 11, an LD 13, a half mirror 15, a photo detector 17, and a pickup frame 19. The 11 is for irradiating a light on the 3 and for receiving the light reflected from the 3. The 13 is for transmitting the light to the 11. The 15 is a plate shape member for reflecting the light outputted from the 13 and for transmitting the light to the 11, that the light from the 11 permeate. The light permeating through the 15 incidents on the 17. The 11, the 13, and the 17 are fixed on the 19 at predetermined positions. A side part of the 15 is fixed to the 19 at three points by using an adhesive agent.

5 Claims, 2 Drawing Sheets

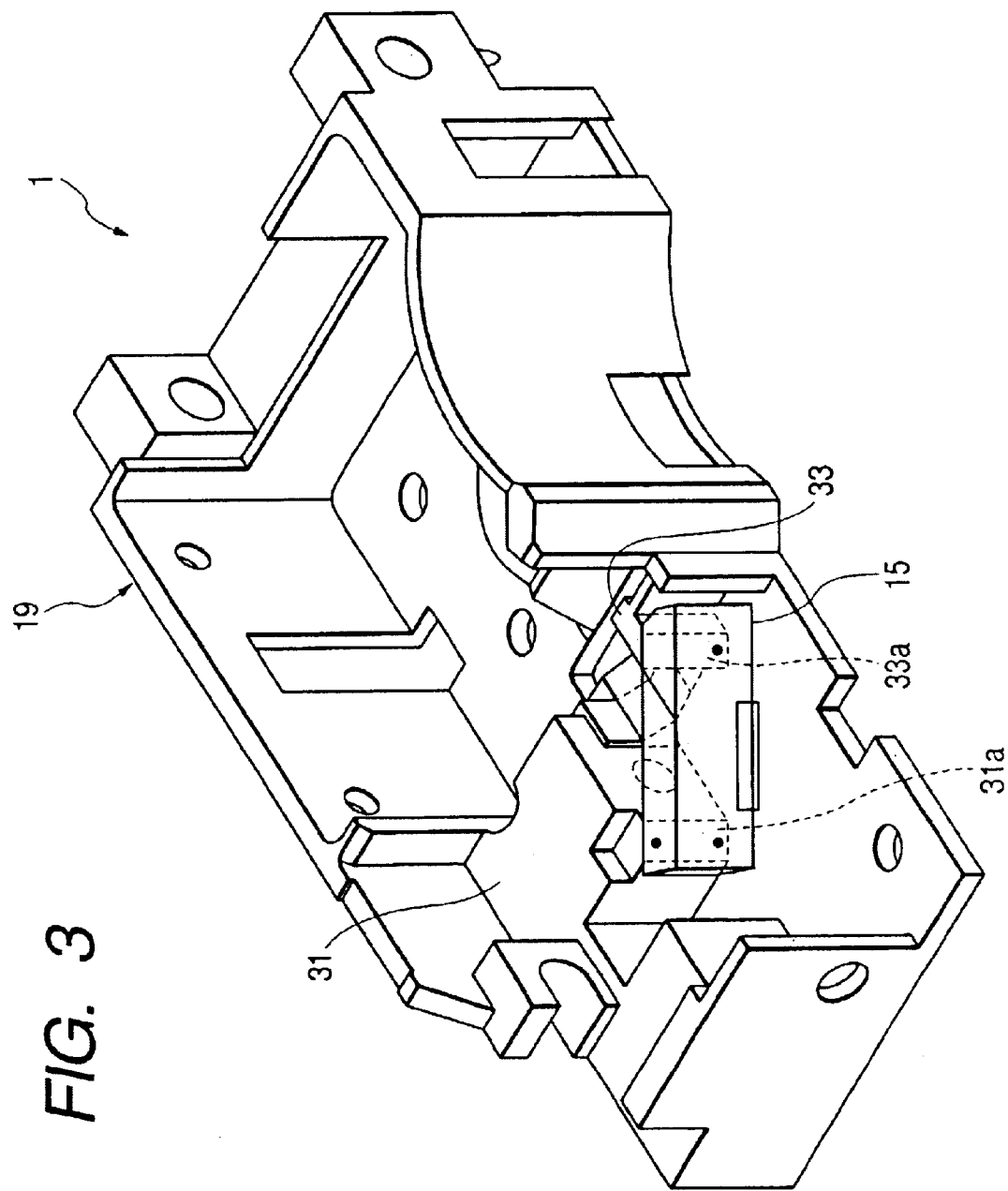

PICKUP APPARATUS FOR DISK PLAYER HAVING A FRAME FOR SUPPORTING A HALF-MIRROR

BACKGROUND OF THE INVENTION

1. Field of the Invention

This invention relates to a pickup apparatus for a disk player, and more particularly to a pickup apparatus for optically reading-out information on a disk arranged in the disk player.

2. Description of the Related Art

A disk player for replaying a disk-shaped optical disk such as an LD comprises a pickup apparatus for optically reading-out information on a rotating disk. The pickup apparatus of this sort generally comprises a pickup, a light emitting portion, a half mirror, and a detecting portion. The pickup is for transmitting a light to the disk and for receiving the light reflected from the disk. The half mirror is a plate shape member for reflecting the light outputted from the light emitting portion and for transmitting the light to the pickup, that the light from the pickup permeate. The light permeating through the half mirror incidents on the detecting portion.

Concerning such a pickup apparatus, when the disk player is instructed to replay the disk, the light emitting portion outputs the light. The light is reflected on the half mirror, and it reaches the disk via the pickup. Then, the light is transmitted to the half mirror passing through the pickup after being reflected on the disk, and moreover, it permeates the half mirror and incidents on the detecting portion.

Besides such a pickup apparatus, there has already been proposed techniques disclosed in Japanese Patent Application Publication No. HEI 6-30165 and Japanese Patent Application Laid-Open Publication No. SHO 58-82212 as a conventional pickup apparatus.

The apparatus disclosed in Japanese Patent Application Publication No. HEI 6-30165 comprises a hologram used for miniaturizing and lightening the apparatus instead of a lens of the pickup and the like, and a light-leading member for implementing transmission of the light among the light emitting portion, the hologram, and the detecting portion. In this apparatus, the hologram, the light emitting portion, and the detecting portion are directly fixed to the light-leading member. Accordingly, in the case where such a light-leading member is fixed inside the apparatus, it is less necessary to consider an arrangement position of each member than the case of the above-mentioned apparatus wherein the half mirror is arranged separately from the light emitting portion and the like.

On the other hand, in the apparatus disclosed in Japanese Patent Application Laid-Open Publication No. SHO 58-82212, each member is arranged separately from each other, and the half mirror is fixed to the frame by the adhesive agent. Moreover, in this apparatus, in order to suppress a distortion of the half mirror caused by shrinkage of the adhesive agent during a cure thereof, the half mirror is supported with three points, which is the minimum number of point required for determining its position. Concretely, the half mirror is placed on the three projections extending upward from a flat base, and is fixed by the adhesive agent applied on an edge of each projection.

In the apparatus disclosed in Japanese Patent Application Laid-Open Publication No. SHO 58-82212, the half mirror is installed from the upper part to the frame. However, in such a structure, the above-mentioned projections must be formed so that an area whereat the both are adhered to each other can be minimized for preventing the distortion of the half mirror from occurring.

Moreover, when assembling this apparatus, the half mirror is installed so as to be placed on the three projections. Therefore, the three points are fixed at an approximately same time. Accordingly, in such a structure, it is difficult to determine the position of the half mirror while fine-tuning it to the frame.

SUMMARY OF THE INVENTION

An object of the present invention is to install the half mirror on the frame without providing a means for supporting the half mirror. Moreover, another object of the present invention is to provide the pickup apparatus that can determine the position of the half mirror while fine-tuning it to the frame.

To achieve the above object, according to a first aspect of the invention, there is provided an apparatus for optically reading-out information on a disk arranged in the disk player comprising a pickup, a light emitter portion, a half mirror, a detecting portion, and a frame. The pickup is for irradiating a light on the disk and for receiving the light reflected from the disk. The light emitting portion is for transmitting the light to the pickup. The half mirror is for reflecting the light outputted from the light emitting portion and for transmitting the light to the pickup and has a plate shape, that can let the light from the pickup permeate. The light permeating through the half mirror incidents on the detecting portion. The pickup, the light emitting portion, and the detecting portion are fixed on the frame at predetermined positions. A side part of the half mirror is fixed to the frame at three points by using an adhesive agent.

When the disk player is instructed to replay the disk, the light emitting portion outputs the light. The light is reflected on the half mirror, and reaches the disk via the pickup. Then, the light is transmitted to the half mirror passing through the pickup after being reflected on the disk, and moreover, it permeates the half mirror and incidents on the detecting portion.

In this apparatus, the side part of the half mirror is fixed to the frame. That is to say, this half mirror can be installed on the frame from a transverse direction. Owing to this, the half mirror can be fixed by using, for example, the side wall part formed in the frame, and it is not necessary to especially provide the means for supporting the half mirror like it is in the techniques disclosed in the above-mentioned publications.

Moreover, in this apparatus, the half mirror can be installed from the side to the frame so the three points can separately be fixed.

For example, it is possible to fix the half mirror by applying the adhesive agent to two of the three points, and adhere another point to the frame later. If assembly operation is implemented in this manner, it becomes possible to, for example, fine-tune a gradient of the half mirror when fixing it at the first two points, and determine the last fixing position of the half mirror by fixing it at the remaining one point.

According to a second aspect of the invention, two of the three points are located near the light emitting portion.

The light generates more drift of a phase or the like as its distance from the light emitting portion becomes longer. Accordingly, if the half mirror can be fixed to the frame stably near the light emitting portion, the light can be reflected under a stable state.

Here, in this apparatus, two of the three points are fixed at the positions near the light-emitting portion so that the drift occurring to the light on a reflecting surface can be smaller.

According to a third aspect of the invention, the half mirror is fixed to the frame at parts with high intensity.

In this apparatus, the half mirror is fixed at positions being stable in intensity so that an influence by an external force on the half mirror can be reduced even when the external force is caused by an oscillation or an impact during transportation. Accordingly, there can be suppressed inconvenience on reflection and permeation of the light due to, for example, the drift of the position of the half mirror.

According to a fourth aspect of the invention, the adhesive agent is a photocuring resin.

In this apparatus, the adhesive agent is cured by irradiating the light so the installation operation of the half mirror becomes easier, and moreover, fine-tuning the position, gradient, and the like of the half mirror can be implemented easily.

BRIEF DESCRIPTION OF THE DRAWINGS

FIG. 3 is a perspective diagram showing a pickup frame and a half mirror of the pickup apparatus.

DETAILED DESCRIPTION OF THE PREFERRED EMBODIMENTS

Now, a description will be given in more detail of preferred embodiments of the invention with reference to the accompanying drawings.

Figure 1:
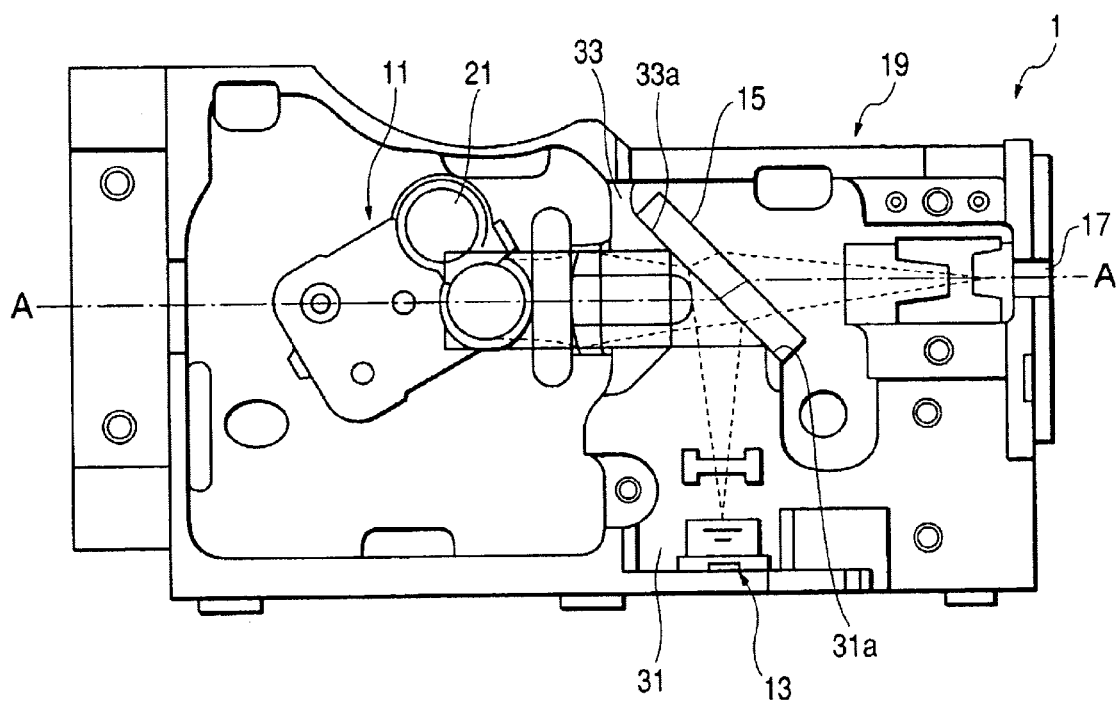
FIG. 1 is a top view showing a pickup apparatus to which an embodiment of the present invention is adopted.

FIG. 1 shows a pickup apparatus 1 whereto an embodiment of the present invention is adopted.

The pickup apparatus 1 is an apparatus for optically reading-out information on a disk-shaped optical disk 3 (refer to FIG. 2) such as a laser disk, and is arranged at a lower part of a circumferential area of the disk 3. It comprises a pickup 11, a laser diode 13 (referred as LD below), a half mirror 15, a photo detector 17, and a pickup frame 19.

Figure 2:
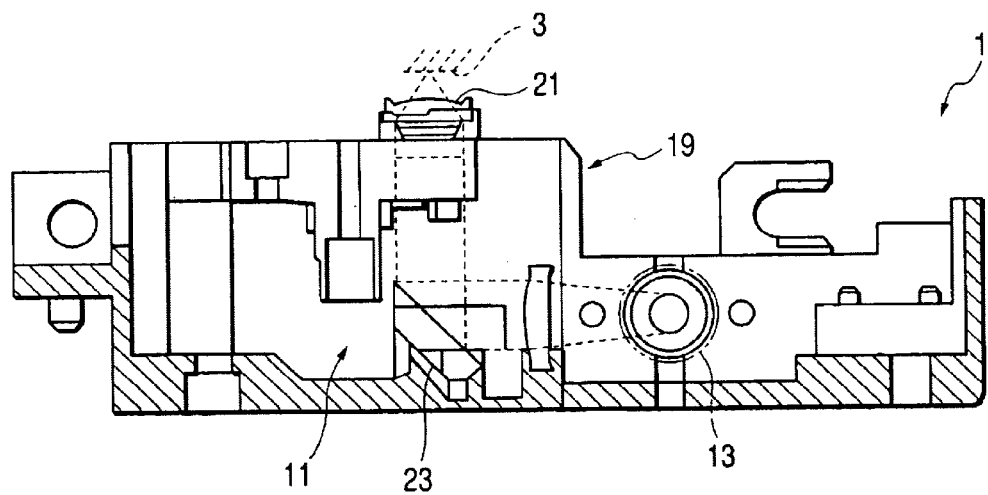
FIG. 2 is a section taken along an A—A line in FIG. 1.

The pickup 11 has an objective lens 21 and a reflecting mirror 23 (refer to FIG. 2). The objective lens 21 is for narrowing down the light reflected on the reflecting mirror 23 and for irradiating the light to the disk 3 while receiving the light reflected on the disk 3. The reflecting mirror 23 is for transmitting the light from the LD 13 to the objective lens 21.

The LD 13 is for transmitting the light to the disk 3 via the pickup 11.

The half mirror 15 is a plate-shaped member for reflecting the light outputted from the LD 13 and for transmitting it to the pickup 11, that can let the light from the pickup 11 permeate. The half mirror 15 is fixed to the pickup frame 19 from a side direction, and moreover, it is fixed to the pickup frame 19 at three points (three black points in FIG. 3) by using the adhesive agent (not shown in figures). The adhesive agent is made of a photocuring resin that is cured by ultraviolet-ray irradiation. Two of the three points whereat the half mirror 15 is fixed are located on a wall part 31a of a rib 31 (mentioned below), and another point is located on a wall part 33a of a rib 33 (mentioned below).

The light from the pickup 11 permeating the half mirror 15 incidents on the photo detector 17, and signals on the disk is read-out owing to this.

The pickup 11, the LD 13, and the photo detector 17 are fixed to the pickup frame 19 at predetermined positions, and owing to this, a relative arrangement of the three elements is determined. On the pickup frame 19, there are formed the rib 31 whereto the LD 13 is fixed and the rib 33 formed facing the rib 31. On the ribs 31 and 33, there are respectively formed the wall parts 31a and 33a formed so that they can directly be adhere on one side of the half mirror 15 respectively. The intensity of the ribs 31 and 33 are higher than the other parts of the pickup frame 19.

Next, an explanation will be given of operations of the pickup apparatus 1. Besides, dotted lines in FIG. 2 and FIG. 3 show a course of the light from the LD 13.

The light is outputted from the LD 13 when the disk player is instructed to replay the disk. The light is reflected on the half mirror 15 (refer to FIG. 2), and reaches the disk 3 via the reflecting mirror 23 and the objective lens 21 (refer to FIG. 3). Then, the light is transmitted to the half mirror 15 via the objective lens 23 and the reflecting mirror 21 after being reflected on the disk 3, and moreover, it permeates the half mirror 15 and incidents on the photo detector 17.

When assembling the pickup apparatus 1, the adhesive agent is applied to, for example, one point at a lower part on the wall part 31a and one point on the wall part 33a among the three points at first, and the half mirror 15 is adhered to the determined position at these two points by making it approach from a transverse direction. Then, before the adhesive agent dries out, the gradient of the half mirror 15 is determined by fine-tuning the half mirror 15 by using these two points as fulcrums. After determining the gradient of the half mirror 15, the adhesive agent is made exist between one point at the upper part on the wall part 31a and the half mirror 15. Finally, the half mirror 15 is fixed to the pickup frame 19 by curing the adhesive agent by the ultraviolet-ray irradiation.

In the pickup apparatus 1, it is possible to install the half mirror 15 from the transverse direction to the frame. Therefore, the half mirror 15 can be fixed to the frame while fine-tuning its position, gradient, and the like.

Moreover, the half mirror 15 can be fixed by using the side wall parts 31a and 33a formed in the pickup frame 19 so that it is not necessary to especially provide the means for supporting the half mirror 15 on the pickup frame 19.

(a) The points whereat the half mirror 15 is adhered by using the adhesive agent are not limited to points on a flat surface of the half mirror 15, and may be points on an end face of the half mirror 15.

(b) The points whereat the half mirror 15 is fixed are not especially limited as long as they are points whereat the half mirror 15 can be installed on the pickup frame 19 from the side direction.

According to the present invention, a half mirror can be installed on a frame without providing a means for supporting the half mirror. Moreover, according to the present invention, the position of the half mirror can be determined while fine-tuning it.

What is claimed is:

1. A pickup apparatus for a disk player for optically reading-out information on a disk arranged in the disk player comprising:

a pickup for irradiating a light on said disk and for receiving the light reflected from said disk;

a light-emitting portion for transmitting the light to said pickup;

a plate-shaped half minor for reflecting the light outputted from said light emitting portion and for transmitting the light to said pickup, that the light from said pickup permeate;

a detecting portion whereon the light permeating through said half mirror incidents; and a frame whereto said pickup, said light emitting portion, and said detecting portion are fixed at predetermined positions, wherein a first side part of said half mirror is fixed to a first vertical wall of said frame at two points and second side part of said half-mirror is fixed to a second vertical wall of said frame at one point by using an adhesive agent.

2. The pickup apparatus for the disk player according to claim 1, wherein said half mirror is fixed to said frame at a fixing part to which said light-emitting portion is fixed and at a part that is opposed to said fixing part.

3. The pickup apparatus for the disk player according to claim 1, wherein said adhesive agent is a photocuring resin.

4. A pickup apparatus for the disk player for optically reading-out information on a disk arranged in the disk player comprising:

a pickup for irradiating a light on said disk and for receiving the light reflected from said disk;

a light-emitting portion for transmitting the light to said pickup;

a plate-shaped half mirror for reflecting the light outputted from said light emitting portion and for transmitting the light to said pickup, that the light from said pickup permeate;

a detecting portion whereon the light permeating through said half mirror incidents; and a frame whereto said pickup, said light emitting portion, and said detecting portion are fixed at predetermined positions, wherein a first side part of said half mirror is fixed to a first vertical wall of said frame at two points and second side part of said half-mirror is fixed to a second vertical wall of said frame at one point by using an adhesive agent, wherein the two points are located near said light emitting portion.

5. A method for affixing a half mirror in a pickup apparatus for a disk player, comprising:

tentatively fixing a first side part of half mirror at one point and a second side part of the half mirror a one point by an adhesive agent;

finely tuning the position of the half mirror;

tentatively fixing the first side part of the half mirror at another point by the adhesive agent; and fixing the half mirror by curing the adhesive agent.

* * * * *